United States Patent Office.

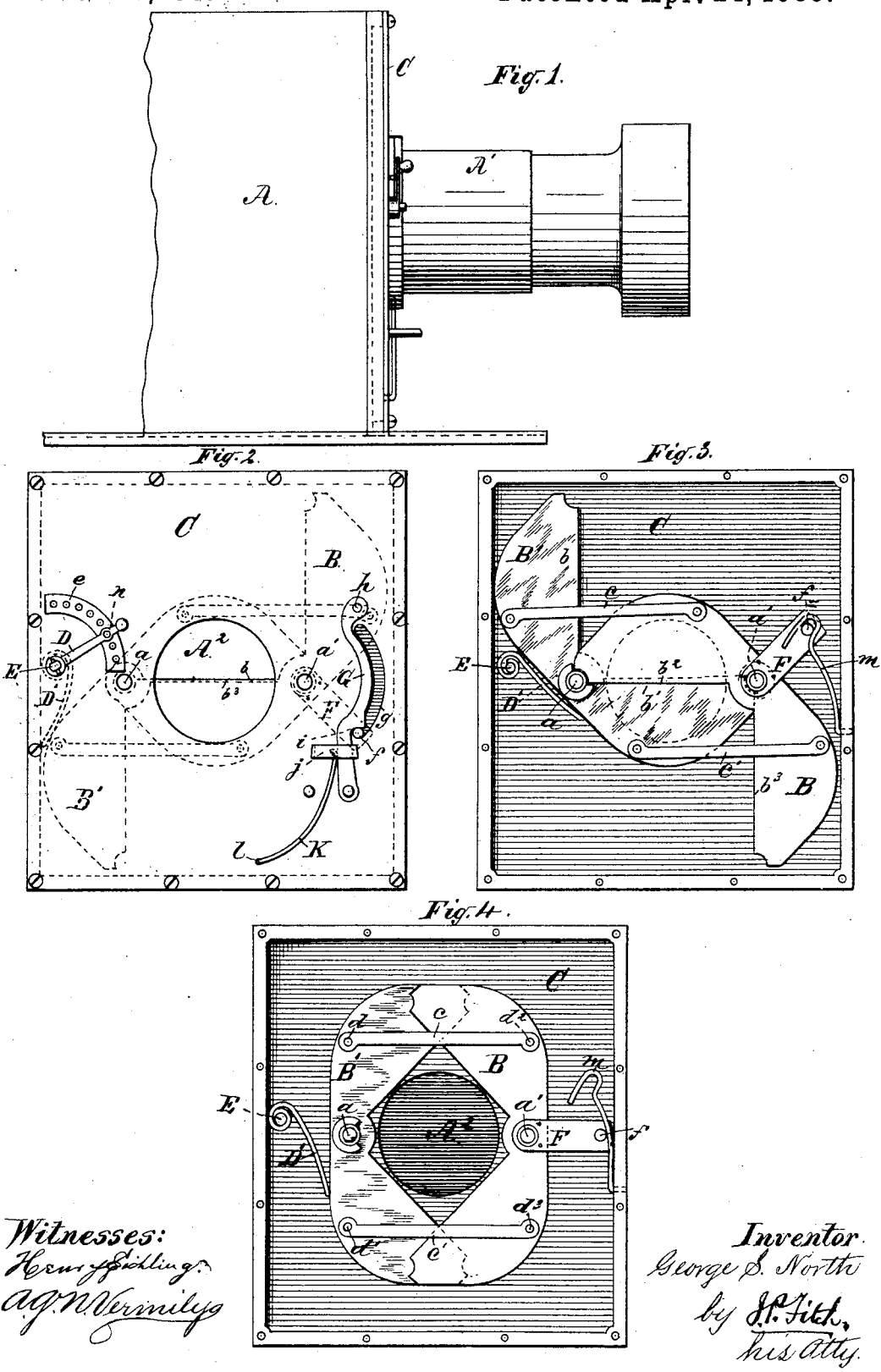

GEORGE S. NORTH, OF SOUTH NORWALK, CONNECTICUT.

PHOTOGRAPHIC CAMERA.

SPECIFICATION forming part of Letters Patent No. 276,455, dated April 24, 1883.

Application filed February 24, 1883. (No model.)

*To all whom it may concern:*

Be it known that I, GEORGE S. NORTH, residing at South Norwalk, in the State of Connecticut, have invented a new and useful Improvement in Photographic Cameras, of which the following is a specification, reference being had to the accompanying drawings, forming part of the same, in which—

Figure 1 is a side view of a portion of a camera to which is attached my improvement. Fig. 2 is a front end elevation of the same. Fig. 3 is an inner face view of the front end wall or plate of the camera, showing the shutters constituting my improvements, which are to be seen in said inner face in position to close the aperture through which light is admitted to the interior of the camera; and Fig. 4 is a similar view, showing the said shutters in position to leave said aperture open.

My invention relates to shutters in photographic cameras which operate to effect an instantaneous exposure of the lenses that admit the light to the photographic plates in the chamber of the camera; and it consists in the devices hereinafter described and claimed.

A represents a side elevation of the front end of a camera; A', the lens-tube, and $A^2$ the aperture through which light is admitted onto the photographic plate within the camera-case.

B and B' represent two revolving shutters, pivoted, respectively, at $a$ and $a'$ on the inner face of the front end wall or plate, C, of the camera. The shutters may have the peculiar form shown in Figs. 3 and 4, each having in its inner edge a deep indentation, the sides $b$ $b'$ $b^2$ $b^3$ of which are straight, the two edges in each shutter being at right angles to each other. It is obvious that when shutters thus formed and pivoted are swung into the position shown in Fig. 3 the edge $b'$ of the one and $b^2$ of the other will come together and close the aperture $A^2$, and that when they are swung in the opposite direction first the said two edges $b'$ and $b^2$ will recede from each other, thus uncovering the said aperture, as seen in Fig. 4, the exposure beginning at the center of the same and extending outward, and then the two edges $b$ and $b^3$ will approach each other and meet at the center of said aperture, thereby again closing it, beginning at the outer opposite edges of the aperture and closing at the center. The shutters are connected together by the two bars $c$ $c'$, the same being pivoted at their ends to the shutters at $d$ $d'$ $d^2$ $d^3$, respectively, whereby motion is communicated from one shutter to the other.

D' is a spring, one end of which is secured to the inner end of a short shaft, E, which projects from the inner face of the plate C, and is pivoted in said plate and fitted to revolve in a hole therein. The opposite end of said spring rests against the edge of the shutter B', below the pivot $a$. The shutters being placed in the position shown in dotted lines in Fig. 2 and left free to move, the action of the spring is to swing them into the position shown in full lines in Fig. 3, and when such movement takes place then occurs an instantaneous opening and closing of the aperture $A^2$.

D is an arm fixed at one end on the outer end of the shaft E. In the opposite end is fixed a pin, $n$, projecting inward toward the plate C. In said plate is a curved series of holes, $e$, into which the pin $n$ takes. By swinging the arm D to the left or right and allowing the said pin to take into a hole at the point reached, a greater or less degree of tension may be given to the spring D', whereby the shutters are made to move quicker or slower, as desired.

F is an arm fastened to the shutter B. In its outer end is a stud, $f$, which projects through a curved opening, $g$, in the plate C, and extends somewhat beyond the outer surface of said plate.

G is an arm pivoted at $h$ on the outer face of the plate C. It is provided with a notch at $i$.

$j$ is a keeper attached to the plate C, within which the lower end of the arm G moves, and by which its movement is limited.

K is a spring, one end of which is fastened at $l$ to the plate C, the other end acting against the lever G to push it to the right. By this arrangement the notch $i$ on said arm is made to act as a stop to detain the arm G when depressed to swing the shutters into the position shown in dotted lines in Fig. 2, the stud $f$ being caught on said notch when in this position. Then by swinging said arm G to the left the stud is relieved from the notch, and the shutters are thrown by the action of the spring D' into the position shown in Fig. 3, making an exposure of the aperture in so doing.

$m$ is a detaining-spring, one end of which is fixed in the plate C and the other looped, as shown in Fig. 3, in which the end of the pin $f$, which projects from the inner face of the arm F, is caught, thereby preventing a recoil of the shutters when thrown into the position shown in said Fig. 3.

I have described and shown what I regard as the best form of the shutters; but I do not limit myself to such precise form; any other equivalent form may be adopted.

What I claim as my invention, and desire to secure by Letters Patent, is—

1. The combination, with a photographic camera, of the plate C, provided with the aperture $A^2$, the shutters B B', pivoted on said plate at $a$ $a'$, respectively, the connecting-rods $c$ $c'$, and the spring D', as and for the purpose described.

2. The combination, with a photographic camera, of the shutters B B', pivoted on plate C, connecting-rods $c$ $c'$, spring D', arm D, provided with the pin $n$, and series of holes $e$, all as and for the purpose described.

3. The combination, with a photographic camera, of the shutters B B', pivoted on the plate C, which is provided with the curved opening $g$, the rods $c$ $c'$, the arm F, fastened in the shutter B, and provided with the stud $f$, the arm G, provided with the notch $i$, the keeper $j$, and the spring K, all as and for the purpose described.

4. The combination, with a photographic camera, of the shutters B B', pivoted on the plate C, the rods $c$ $c'$, the spring D', the arm F, provided with the stud $f$, and the spring-catch $m$, all as and for the purpose described.

GEORGE S. NORTH.

Witnesses:
JACOB M. LAYTON,
GEORGE F. BEARSE.